T. Mayor.
Spinning Mach.
No. 1,950. Reissued May 9, 1865.
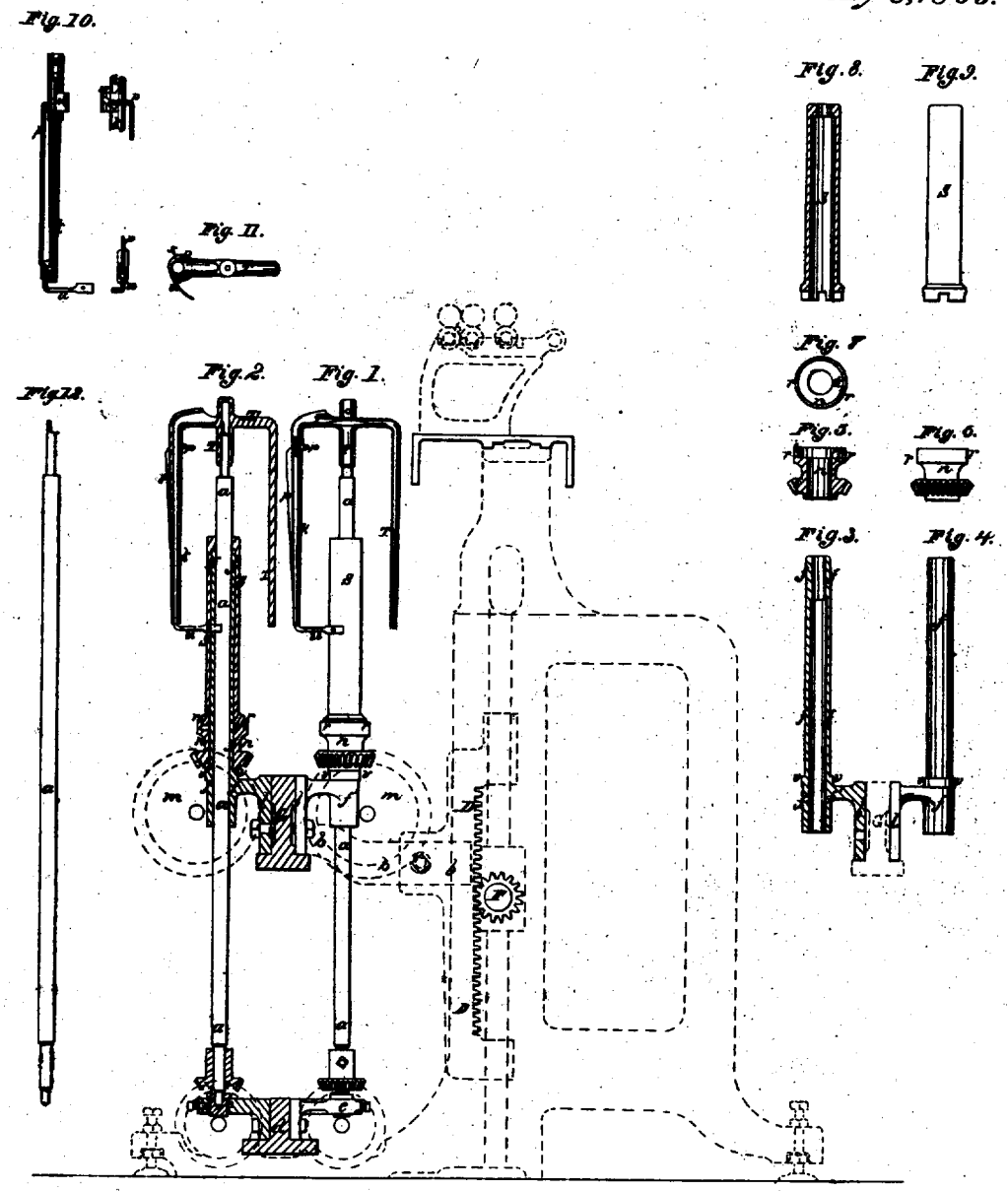
Witnesses
Isaac A. Bonnell
Francis Colwell Jr.
Inventor,
Thomas Mayor.
THE ECKERT LITHOGRAPHING CO., WASHINGTON, D. C.

UNITED STATES PATENT OFFICE.

GEORGE CHATTERTON, OF PROVIDENCE, RHODE ISLAND, ASSIGNEE OF THOMAS MAYOR.

IMPROVEMENT IN ROVING-FRAMES.

Specification forming part of Letters Patent No. 46,530, dated February 21, 1865; Reissue No. 1,950, dated May 9, 1865.

*To all whom it may concern:*

Be it known that THOMAS MAYOR, of Pawtucket, in the county of Providence and State of Rhode Island, has invented a new and useful Improvement in Roving-Frames for Spinning, Roving, &c.; and I do hereby declare that the following is a full, clear, and exact description of the same, reference being had to the accompanying drawings, making part of this specification, in which—

Figure 1 is an elevation of a roving-spindle and its appendages which embody the improvement. Fig. 2 is a vertical section of the same. Fig. 3 is a vertical section of the improved spindle-bolster detached. Fig. 4 is an elevation of the same. Fig. 5 is a vertical section. Fig. 6 is an elevation, and Fig. 7 is a plan of the gear and collar for revolving the bobbin. Fig. 8 is a vertical section, and Fig. 9 is an elevation of the bobbin that is designed to be used with the improved gear and collar. Fig. 10 is an elevation of a flier and presser, and Fig. 11 is a plan of the same. Fig. 12 is an elevation of the spindle detached.

An end elevation of the roving-frame to which my improvement is applied is shown in dotted lines properly arranged in connection with Figs. 1 and 2.

Similar letters of reference indicate corresponding parts in all the figures.

My invention consists in so constructing the bolster or part that forms the upper bearing to the spindles of roving-frames and connecting it to the traverse-rail which carries the bobbins longitudinally upon the spindles as to extend the upper bearing near to the top of the spindle, and to reciprocate the said bearing between the top of the spindle and the delivering point of the flier which delivers the roving to the winding-bobbin, or between the top of the spindle and the traverse-rail, for the purpose of giving a firm support and bearing to the top of the spindle and to admit of its running with uniform steadiness at the higher rates of speed.

To enable others skilled in the art to make and use my invention, I will proceed to describe the same.

In the drawings, *a*, Figs. 1, 2, and 12, is the roving-spindle having one bearing at the bottom, in the step *e*, which is firmly secured to the stationary rail *d*, and another bearing near the top formed by the bolster *f*. At the top of the spindle is secured the flier T, to revolve which is the office of the spindle, for the purpose of putting the requisite twist into the roving and winding the same on the bobbin as it is twisted.

The bolster *f* is constructed as shown in Figs. 3 and 4. It is cast solidly in one piece of metal, and consists of a tube or sleeve, *f*, surrounding the spindle, the upper interior portion of which forms the upper bearing to the spindle, while the exterior portion forms a bearing for the collar *n* and the bobbin S, and the tube *f* has a standard or foot-piece, *l*, formed on one side of its base *f'*, by which it is secured to the side of the traverse-rail G, as shown in Figs. 1, 2, 3, and 4. This rail G has a vertical reciprocating movement produced by the rack D, to which the rail G is connected by the arms *b* and the pinion F by the revolution of the latter in opposite directions alternately, and the tube *f* may extend above the traverse-rail G to such a height as will place the upper end of the bolster-tube at the top of the spindle when the traverse-rail is at its highest elevation. Instead, however, of having a bearing for the spindle throughout the entire length of the tube, I make a bearing of some two or three inches in length at the top of the tube and bore the remaining length as much larger than the spindle as is necessary to free it from contact therewith while it is turning.

The advantage of casting or forming the bolster of one piece instead of two, consisting of a standard or arm, which is secured to the rail, and is formed with a sleeve or socket, in which the second piece, consisting of a tube or bushing, is placed and held by a set-screw is that the structure is primarily much stiffer and therefore suffers less from wear than the bolster in two pieces, besides being more easily wrought into its desired size and form, and in consequence less expensive.

The advantage of securing the foot-piece *l* of the bolster to the side of the rail, instead of upon the top of the rail, as has hitherto been the practice, is that when, as often happens, the cotton fiber adheres to the whirling spindle, and by the traversing motion of the bolster gets between the spindle and the bolster it so clogs and resists the separate movements of each as to lift or wrench the foot-piece of the bolster from the top of the rail or break the foot-piece from the bolster, either casualty resulting in a stoppage of the entire machine while the injury is being repaired.

Bolsters for this purpose have heretofore been constructed like the base *f'* without the tube above, in which case the upper bearing is placed in the middle of the spindle, which affords so little support to the top that the weight and operation of the flier thereon causes the upper part to shake and wabble, in consequence of which the spindle cannot be driven at a high speed and the bolster and spindle soon wear excessively and by an increased wabbling cause the roving to break frequently, which is exceedingly injurious to the manufacture. To remedy this a long stationary tube has been used, which incloses about half the length of the spindle in the middle of the same, and upon which tube the bobbin and the geared collar, by which it is driven, is revolved and reciprocated longitudinally. This construction does not place the upper bearing nearer the top of the spindle than the distance traversed by the bobbin, or, in other words, than the length of the bobbin, and to prevent the binding which necessarily results from the use of so long a bearing in connection with another bearing (the step) on the same spindle both the said bearings are mounted on swivels, which will compensate for any variation from the true position of either, and thus avoid binding, the whole making a complicated and expensive construction.

It will be seen by reference to the drawings that my improved bolster extends the upper bearing of the spindle near to its top, and only when the traverse-rail is in its lowest position is this bearing placed as low down on the spindle as the delivering point or end of the flier, and that during all other times it is reciprocated between this point and the extreme top of the spindle, and it is in consequence of this relative position of this bearing with the spindle that I am enabled to prevent the spindle from springing and wabbling in its bolster and avoid the excessive wear resulting therefrom, and maintain the same spindles at a higher rate of speed than has heretofore been attained in these machines.

It has been above specified that the improved bolster extends the upper bearing nearer to the top of the spindle, and that greater steadiness is given to the top of the spindle, and that a higher rate of speed is in consequence attainable; but it is obvious that if the tube *f* is made shorter and does not extend nearly to the top of the spindle, but instead but a short distance above the base of the bolster *f*, that approximate results will be attained to that derived from the improved construction hereinabove described, and in a proportionate degree as the bearing is placed and reciprocated nearer to or farther from the top of the spindle; and I therefore wish it understood that I do not limit myself to the use of a bolster of that length which is necessary to produce the extreme result; but that I also claim the use of others of like or substantially the same construction, but which from an inferior length of tube or of traverse only produce approximate results to that above specified.

The bolster has also been above described as having an interior bearing for the spindle of some two or three inches in length at the top of the tube, and as having the remaining length thereof bored out as much larger than the spindle as is necessary to free it from contact therewith, in view of which it should be here stated that I am aware that a bolster has heretofore been constructed with two bearings for the spindle, one at the top of the tube and the other at the bottom thereof, with the intervening space chambered out, so as to be free from contact with the spindle, and that the former with one bearing only at the top of the tube constitutes an improved construction as compared with the latter with two bearings, inasmuch as it avoids in the latter the binding above alluded to with reference to one long bearing, in which respect it is the equivalent thereof, and overcomes the objections to the lower bearing and intervening chamber, and leaves the bottom of the tube open, so that the dirt and foreign matter may freely escape therefrom, instead of accumulating with the oil around the lower bearing in the chamber, and by the friction thus created hinder the spindle from turning freely.

The bobbin S, Figs. 1, 2, 8, 9, is formed as shown, and incloses the upper part of the bolster-tube *f*, having a bearing of about a half an inch at the top of the spindle. The lower end of the bobbin rests upon the geared collar *n*, Figs. 1, 2, 5, and 6, which is fitted to turn freely on the lower part of the tube *f*, resting on the shoulder *v* at its base. The collar *n* is revolved by means of the gear *m*, shown in dotted lines, and the motion thereof is communicated to the bobbin by means of the dog *i* on the collar, which enters one of the notches cut in the bottom of the bobbin in the usual way. Besides this, the collar *n* is formed with an annular lip, *r*, at its periphery, which surrounds and incloses the lower end of the bobbin, giving it a central inclination and position on the collar and preventing its interior surface from coming in contact with the tube *f*, and by the friction which it would thus create interfere with its free operation. This lip *r* also prevents the oil with which the collar is lubricated from being thrown off in revolving, and has other important advantages.

The flier T is formed in the usual way, and the presser-finger *u* is the continuation of a long rod or wire, *p*, to which it is bent at right angles, as shown in Fig. 10. This rod *p* is arranged parallel with the delivering-tube *k* of the flier, having one bearing in the ear $x$, near the end and upon one side of the same, and another bearing at its upper end, in the ear $w$, on the opposite side of the tube $k$, the end of the rod being curved at right angles at the top, as shown in Figs. 10 and 11, and it will be seen by reference to Fig. 10 that the upper surface of the ear $x$ is inclined, and that the bend or offset in the rod above rests on said incline; also, that there is an incline slot or opening through which the upper curved end of the rod $p$ enters the ear $w$, the said curved end resting on the lower surface of the inclined slot, and that in consequence of the swinging of the presser-finger upon these two bearings in direction from the center of the bobbin it, with its rod $p$, is lifted by turning upon the inclined surfaces mentioned, so that when the presser-finger is left to itself the weight of it and its rod P, by the action of the inclined surfaces, is swung with a tendency of the finger to press toward the center and against the surface of the bobbin with the force of their combined weight acting on the inclined surface in opposition to the centrifugal force resulting from its rapid revolution. The inclined surfaces serve chiefly to maintain an adequate pressure of the presser-finger against the bobbin while the latter is at rest after its revolution has ceased.

What is claimed as the invention of the said THOMAS MAYER is—

The construction and mode of arranging the bolster with the spindle and the traverse-rail, or its equivalent, substantially as described, for the purpose specified.

GEORGE CHATTERTON.

Witnesses:
ISAAC A. BROWNELL,
WILLIAM BROWNELL.